US008641076B2

(12) United States Patent
Sparkes et al.

(10) Patent No.: US 8,641,076 B2
(45) Date of Patent: Feb. 4, 2014

(54) PIVOTING HITCH ASSEMBLY

(75) Inventors: Vernon W. Sparkes, Calgary (CA);
William J. D. Shaw, Calgary (CA)

(73) Assignee: Vernon W. Sparkes, Calgary (CA)

( * ) Notice: Subject to any disclaimer, the term of this patent is extended or adjusted under 35 U.S.C. 154(b) by 0 days.

(21) Appl. No.: 12/963,234

(22) Filed: Dec. 8, 2010

(65) Prior Publication Data
US 2011/0074133 A1 Mar. 31, 2011

Related U.S. Application Data

(63) Continuation of application No. 10/595,982, filed as application No. PCT/CA2004/002102 on Dec. 6, 2004, now Pat. No. 7,871,097.

(60) Provisional application No. 60/481,929, filed on Jan. 21, 2004, provisional application No. 60/573,756, filed on May 21, 2004, provisional application No. 60/600,824, filed on Aug. 12, 2004.

(51) Int. Cl.
*B60D 1/18* (2006.01)
*B60D 1/167* (2006.01)

(52) U.S. Cl.
USPC ......... 280/480; 280/491.5; 280/493; 280/504

(58) Field of Classification Search
USPC .......... 280/415.1, 416.1, 416.3, 478.1, 479.2, 280/479.3, 480, 491.1, 491.5, 493, 494, 280/495, 504, 514, 515
See application file for complete search history.

(56) References Cited

U.S. PATENT DOCUMENTS 1,438,831 A 12/1922 Jones
2,464,864 A 3/1949 Hoffmeyer
(Continued)

FOREIGN PATENT DOCUMENTS

EP 0122779 7/1984
FR 2043113 2/1971

OTHER PUBLICATIONS

Superwinch®, Copyright 2001-2002 Products/Accessories (Receiver Shackle Bracket—1559B Class III Receiver Hitch Mount), retrieved on Mar. 24, 2005 from Internet URL: http://www.superwinch.com/products/accessories/index.html.

*Primary Examiner* — Kevin Hurley
*Assistant Examiner* — Marc A Scharich
(74) *Attorney, Agent, or Firm* — Pepper Hamilton LLP

(57) ABSTRACT

A clevis pin combination comprises a clevis made of aluminum alloy; and a pin made of steel. This combination of parts and materials results in lighter weight and improved performance of maximum load carrying capacity over similar combinations of all aluminum or all steel. The clevis further comprises a first clevis leg having a first clevis aperture in a first clevis end and a second clevis leg having a second clevis aperture in a second clevis end. The second clevis end is spaced apart from the first clevis end forming an open end. A curved portion connecting the first clevis leg and the second clevis leg forms a closed end. The first clevis aperture and the second clevis aperture are axially aligned and the steel pin is sized to fit through the first clevis aperture and second clevis aperture allowing pivoting movement between the clevis and the pin. The clevis may be substantially U-shaped. At least the curved portion of the clevis may by significantly wider than it is thick, such that it is flat in cross-section. Alternatively, the clevis may be significantly wider than it is thick, such that it is flat in cross-section. The curved portion or the entire clevis may be formed of a single piece of solid aluminum bar stock bent into a U-shape, forming a weldless and seamless U-shaped clevis.

18 Claims, 4 Drawing Sheets

(56) References Cited

U.S. PATENT DOCUMENTS

| | | | |
|---|---|---|---|
| 2,687,899 A | | 8/1954 | Bendsten |
| 2,773,703 A | | 12/1956 | Ferguson et al. |
| 3,146,003 A | | 8/1964 | De Ronde |
| 3,170,718 A | | 2/1965 | Strom |
| 3,290,750 A | * | 12/1966 | Pierce ............... 24/599.5 |
| 4,184,783 A | * | 1/1980 | Hall ................... 403/157 |
| 4,202,562 A | | 5/1980 | Sorenson |
| 4,711,461 A | | 12/1987 | Fromberg |
| 4,807,899 A | | 2/1989 | Belcher |
| 4,842,249 A | * | 6/1989 | Weigand ............. 254/93 R |
| 5,109,931 A | | 5/1992 | Goll |
| 5,152,778 A | * | 10/1992 | Bales et al. ............. 606/205 |
| 5,431,425 A | | 7/1995 | Klinkman |
| 5,570,897 A | | 11/1996 | Wass |
| 5,647,604 A | | 7/1997 | Russell |
| 6,129,371 A | | 10/2000 | Powell |
| 6,158,760 A | | 12/2000 | Kiss |
| 6,536,794 B2 | | 3/2003 | Hancock et al. |
| 6,857,650 B2 | * | 2/2005 | Ward ................... 280/491.3 |
| 7,107,734 B2 | * | 9/2006 | Jines et al. ............. 52/655.1 |
| 7,374,379 B2 | * | 5/2008 | Booher ................. 410/103 |
| 2002/0140206 A1 | | 10/2002 | Lloyd |
| 2006/0087101 A1 | | 4/2006 | Yon |
| 2006/0103111 A1 | * | 5/2006 | Popham ................ 280/478.1 |

* cited by examiner

PIVOTING HITCH ASSEMBLY

PRIORITY CLAIM

This application is a continuation application of U.S. patent application Ser. No. 10/595,982, filed Jun. 19, 2008, which is the National Stage Entry of PCT/CA2004/002102, filed Dec. 6, 2004.

FIELD

The present invention relates to the field of hitch assemblies for use with towing vehicles. It particularly relates to a shock-load towing device suitable for connecting a towing belt to a commercially available tubular trailer hitch receiver.

BACKGROUND

During the course of operating a vehicle, it may be necessary to tow the vehicle for one reason or another, for example if the vehicle were to break down, to slide off a road into a ditch, to get stuck in mud or snow, or to get stuck in any number of other types of terrain (i.e., as with an off-road vehicle such as an ATV or snowmobile). In these situations, it is desirable to have a means of simply and safely dislodging the vehicle if it is stuck and towing it to a desired location (i.e., to a garage, back onto the road, etc.).

It can be difficult to position the tow vehicle properly in order to perform the towing operation, for example where the other vehicle is stuck in a difficult terrain. More importantly, however, there is always a danger, particularly in a situation where the vehicle to be towed is heavy or is firmly stuck, that the towing apparatus will snap or break, or become dislodged (i.e., as with a hook) when it experiences a shock load. In this event a heavy component of the towing apparatus could hit a person inside one of the vehicles or standing nearby, or a vehicle or other property. In fact, individuals have been killed or severely injured when towing belts or shackles have broken, or when hooks have become dislodged.

There is a need in the art for a strong and sturdy hitch assembly that can be used as a towing device, which is easy to use and which will not break under most circumstances.

DRAWINGS

SUMMARY

Figure 1:
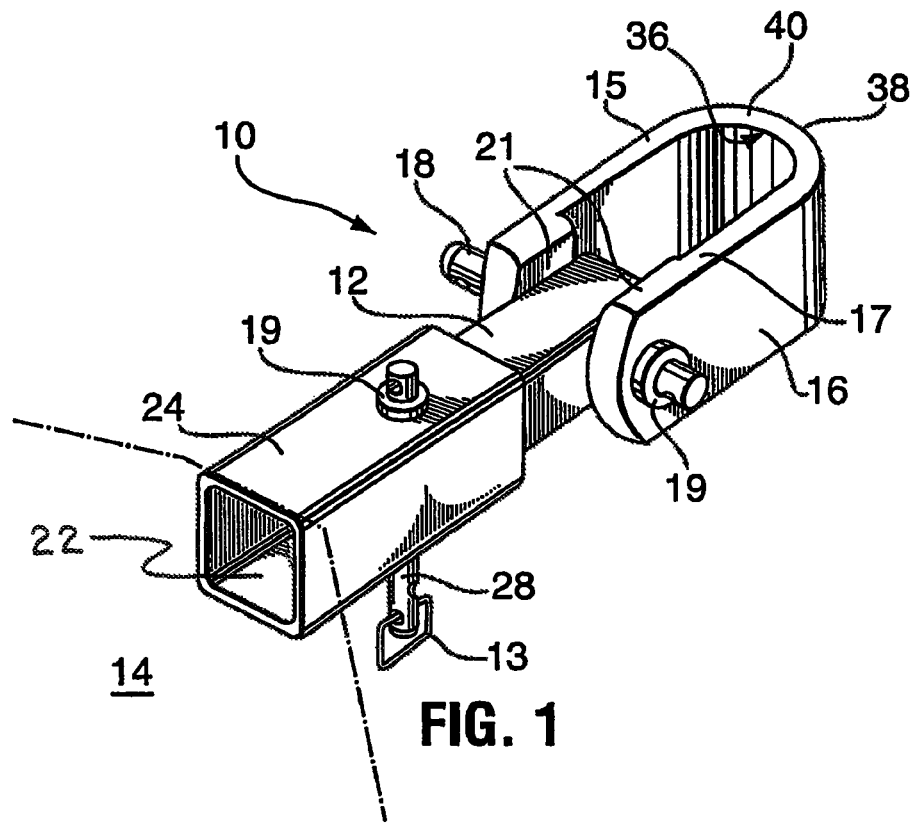
FIG. 1 is a side perspective view of an embodiment of the hitch assembly disclosed herein.
Figure 2:
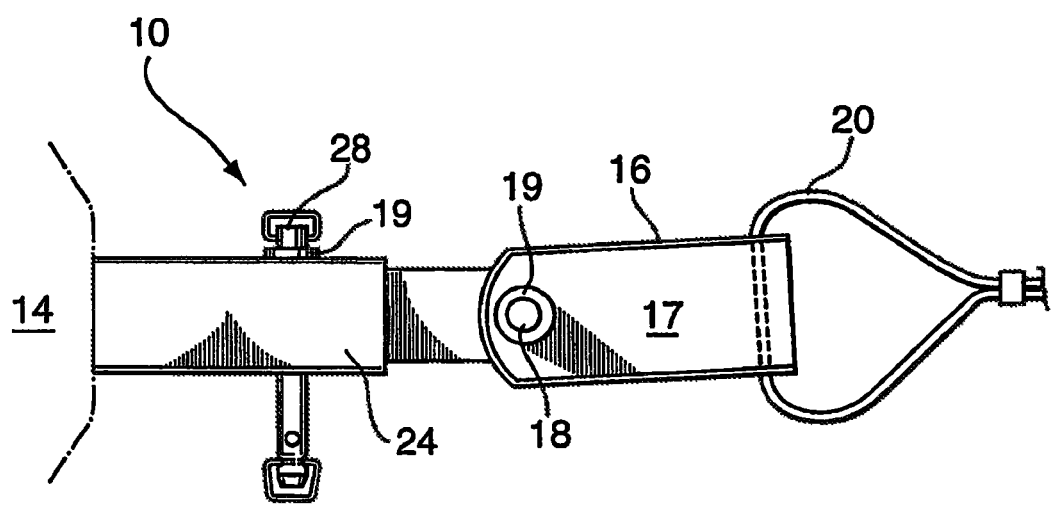
FIG. 2 is a top elevation view of an embodiment of the hitch assembly disclosed herein with a towing belt mounted thereon.
Figure 3:
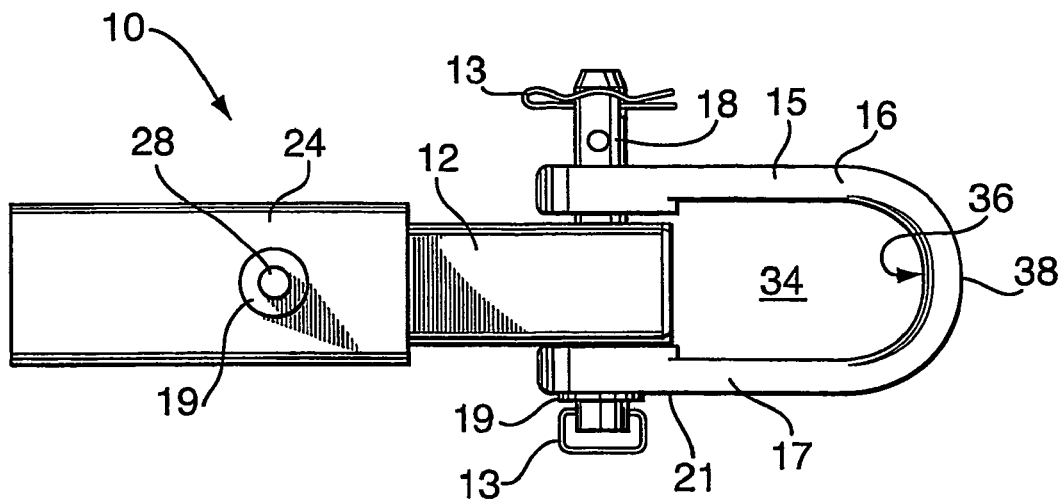
FIG. 3 is a side elevation view of an embodiment of the hitch assembly disclosed herein.

Provided herein is a clevis pin combination that is strong and lightweight, relatively safe, and of cheap and simple construction. The clevis pin combination may be used, for example, in conjunction with a hitch assembly to tow a vehicle with another vehicle. The clevis pin combination is particularly suitable for use as a shock-load towing device. The clevis pin combination disclosed herein may be used as part of a hitch assembly to connect a towing member, such as a towing belt, to a trailer hitch receiver, and the towing member is in turn connected to a second vehicle, which may be either the tow vehicle, or the vehicle being towed.

According to one embodiment of the invention, a clevis pin combination is disclosed comprising a clevis made of aluminum alloy and a pin made of steel.

In one embodiment, the clevis further comprises: a first clevis end; a first clevis aperture at the first clevis end; a second clevis end; a second clevis aperture at the second clevis end; the first clevis aperture at the first clevis end being axially aligned with the second clevis aperture at the second clevis end; and the pin extends through the first clevis aperture at the first clevis end and the second clevis aperture at the second clevis end.

According to one aspect of the invention, the second clevis end is spaced apart from the first clevis end.

According to an embodiment of the invention, the clevis is U-shaped. According to another aspect of the invention, a curved portion of the U-shaped clevis is significantly wider than it is thick, and hence substantially flat in cross section. According to yet another aspect of the invention, the U-shaped clevis is significantly wider than it is thick, and hence substantially flat in cross section.

According to an aspect of the invention, at least the curved portion of the clevis is comprised of a solid, rectangular aluminum bar bent into a U-shape. According to another aspect of the invention, the clevis is comprised of a solid, rectangular aluminum bar bent into a U-shape.

According to another embodiment of the invention, a combination is disclosed comprising:

a clevis made of aluminum alloy, the clevis further comprising:
  a first clevis leg having a first clevis aperture in a first clevis end;
  a second clevis leg having a second clevis aperture in a second clevis end;
  a curved end connecting the first clevis leg and the second clevis leg;
  wherein the first clevis aperture and the second clevis aperture are axially aligned; and
a pin made of steel, wherein the pin is sized to fit through the first clevis aperture and second clevis aperture.

According to an aspect of the invention, the second clevis leg is spaced apart from the first clevis leg to form an open end.

According to an embodiment of the invention, the clevis is U-shaped. According to another aspect of the invention, the curved end of the U-shaped clevis is significantly wider than it is thick, such that it is flat in cross-section. According to yet another aspect of the invention, the U-shaped clevis is significantly wider than it is thick, such that it is flat in cross-section.

According to an aspect of the invention, at least the curved end of the clevis is comprised of a single piece of solid aluminum bar stock bent into a U-shape, forming a weldless and seamless U-shaped clevis. According to another aspect of the invention, the clevis is comprised of a single piece of solid aluminum bar stock bent into a U-shape, forming a weldless and seamless U-shaped clevis.

In one embodiment, the hitch pin is comprised of 4140 hot-rolled steel. In yet another embodiment, the hitch assembly is comprised partially of aluminum alloy. In yet another embodiment the coupling tongue is comprised of aluminum alloy. In yet another embodiment, the clevis is comprised of aluminum alloy. In yet another embodiment, the coupling tongue and the clevis are comprised of aluminum alloy.

In another aspect, the invention is the use of the clevis pin combination with a coupling tongue of a hitch assembly and a towing belt to tow a vehicle.

DETAILED DESCRIPTION

Reference will now be made to FIGS. 1-9, which show various embodiments of the hitch assembly. The hitch assembly 10 disclosed herein is useful for retrieving vehicles that are stuck in a number of terrains (i.e., deep snow, mud, sand), that have driven off the road (e.g., in snowy or icy conditions), or that are otherwise disabled and in need of being retrieved or towed.

The hitch assembly 10 comprises a coupling tongue 12 for attachment to a receiver 24 on a vehicle 14, a clevis 16 pivotally attached to the coupling tongue by a hitch pin 18, and an opening 34 which can receive the towing member 20.

Coupling tongue 12 is sized for insertion into coupling socket 22 of receiver 24, which is attached to vehicle 14. Such receivers 24 are well known in the art, and are available in different standard shapes and sizes, depending upon the desired towing capacity. The most common receiver 24 is tubular and square in cross section, and may be used, for example, to pull machinery, trailers and such. Therefore, in one embodiment coupling tongue 12 is square in cross section. However it may be any of a number of other shapes in cross section, with polygonal shapes being preferred. Coupling tongue 12 comprises an aperture (not shown), which aligns with apertures (not shown) on receiver 24. Coupling tongue 12 may be reversibly attached and locked to vehicle 14 by the insertion of coupling tongue 12 into coupling socket 22 of receiver 24, insertion of a coupling pin 28 through apertures on receiver 24 and corresponding aperture (not shown) on coupling tongue 12, and by inserting a retainer 13, such as a locking clip in apertures at one or both ends of the coupling pin.

Coupling tongue 12 is a solid construction of metal, or another material of sufficient strength. Coupling tongue 12 preferably made of steel and more preferably made of aluminum.

Clevis 16 is a generally U-shaped element. As such, clevis 16 has two legs, 15 and 17, that are so placed as to overlie coupling tongue 12, on opposite sides of the coupling tongue. Therefore, legs 15 and 17 of clevis 16 are spaced so as to allow coupling tongue to be inserted into, and to pivot, therebetween. In some embodiments coupling tongue fits snugly between legs 15 and 17, to permit very little play between legs 15 and 17, as seen for Example in FIG. 8. In other embodiments, the fit is not as snug and there is more play of coupling tongue 12 between legs 15 and 17, as shown for example in FIG. 3. A snug fit between tongue 12 and legs 15 and 17 is preferred, as this will avoid significant turning or twisting of the clevis and coupling tongue, independently of one another, about the hitch pin 18.

Clevis 16 is pivotally attached, and reversibly locked, to coupling tongue 12. Axially aligned apertures (not shown) formed in legs 15 and 17 align with a corresponding aperture (not shown) on the coupling tongue, to receive hitch pin 18. Therefore, clevis 16 may be mounted onto coupling tongue 12 by the insertion of coupling tongue 12 between legs 15 and 17, followed by insertion of hitch pin 18 through the apertures (not shown) on clevis 16 and through the corresponding aperture on coupling tongue 12, thus interlinking clevis 16 with coupling tongue 12. The hitch pin is held in the aperture by use of retainer 13, such as a locking clip or ring, as is well known in the art.

When mounted onto coupling tongue 12, clevis 16 will freely pivot about hitch pin 18, so that it may be aligned with the load direction applied to it from the towing member, when hitch assembly 10 is in use. It is important that clevis 16 be able to pivot, as vehicles that are in need of being towed are often not positioned in a straight line from the towing vehicle. Therefore, the clevis may swivel to account for angled loads without unduly stressing the towing member at its connection location.

Clevis 16 may be formed of a single piece of suitable solid metal bar stock, such as steel or aluminum bar stock, bent or molded into a desired shape. As such, clevis 16 is weldless and seamless, which may be desired in some applications where greater strength is required. In one embodiment, clevis 16 is formed from a solid, rectangular aluminum bar bent into the desired shape. In some embodiments clevis 16 may be formed by welding two or more pieces of suitable steel bar stock together, however the preferred embodiment is a weldless and seamless clevis 16. As is apparent from all of the Figures, a characteristic feature of clevis 16 is that in cross section it is significantly wider than it is thick, as it is made from a sheet or plate of metal. Therefore, it is flat, or planar, in cross-section. Because it is flat, or planar, in cross section, the interaction between legs 15 and 17 and the coupling tongue occurs over a larger surface area than with D-rings or shackles of similar length. Further, a flat or planar clevis permits larger coupling pins to be used to pivotally couple the clevis and coupling tongue, than with D-rings or shackles of similar length.

In the embodiments shown in the FIGS. 1, 3, 4, 5, and 7, clevis 16 may be reinforced by increasing the thickness of the ends of clevis 16 (that is, at the end of each leg 15 and 17), in the area where hitch pin 18 will be inserted. These areas of reinforcement 21, which in this embodiment may be referred to as "wear plates", provide extra strength and durability to a portion of clevis 16 where a great amount of stress may be encountered. For example, in a situation where the vehicle to be towed is not in a direct line (i.e., a direct vertical and/or horizontal line) with the vehicle doing the towing, bending or twisting forces may be applied to hitch assembly 10. This may result in severe stress on clevis 16 at the ends of the clevis in the areas where hitch pin 18 is inserted, and extra thickness in this area may avoid failure of the hitch assembly when in use. Further, the end of coupling tongue 12 that is inserted into clevis 16 may damage the inner surface of clevis 16, with repeated use of the hitch assembly. The wear plate therefore, because of its extra thickness, provides added strength to clevis 16 in this region, and increases durability, for if the wear plate is somewhat damaged by binding of coupling tongue 12, the hitch assembly may still be used. The wear plates may be on the inside surface of the ends of clevis 16 as shown in the Figures, or on the outside (opposite) surface of clevis 16 (not shown).

Figure 9:
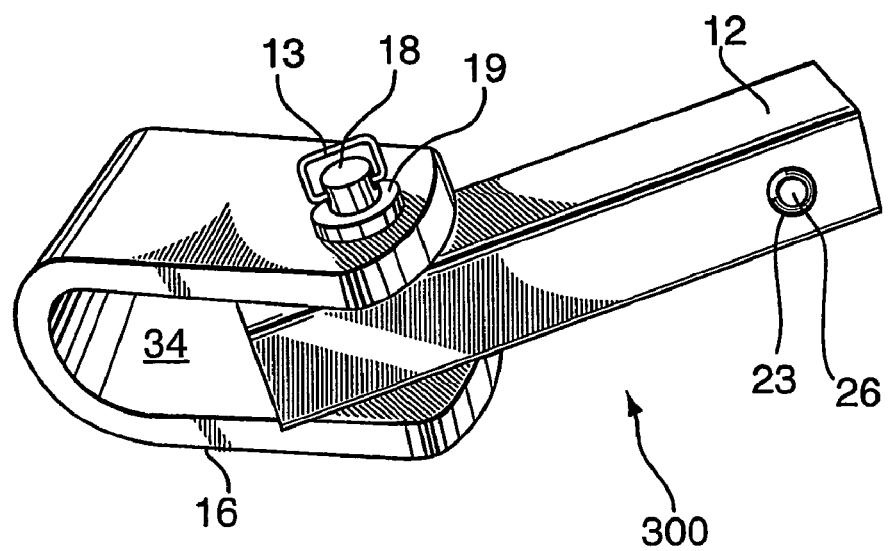
FIG. 9 is side perspective view of an embodiment of the hitch assembly disclosed herein, in a slightly bent position.

As is apparent, clevis 16 may be of uniform thickness throughout, as is shown in embodiment 300 of FIG. 9. This embodiment may be easier to manufacture. However, for some applications, this added uniform thickness may add unnecessary weight. Therefore, by providing a smaller area of increased thickness (i.e., wear plates) at the ends of clevis 16, the strength and durability of a larger and heavier hitch assembly may be obtained, without adding too much weight to the total weight of the assembly.

Hitch pin 18 and coupling pin 28 may be made of steel that can be of varying strengths, depending on the application in which the hitch assembly will be used. For some applications, hitch pin 18 and coupling pin 28 may be made of AISI 4140 heat treated carbon and alloy steel bar, or hot rolled steel. Hitch pin 18 may be any of a number of sizes, depending on the application. Standard sizes include ½ inch, ⅝ inch and ¾ inch diameter, but other diameters may be used. Coupling pin may also be any of a number of sizes, depending on the application, with ½ inch and ⅝ inch being standard sizes. Both hitch pin 18 and coupling pin 28 may have an annular ring 19 pressed onto the pin to aid in the positioning of pins for insertion in their respective apertures. Annular ring 19 may be welded onto the pin, however this is not preferred, as welding may be undesirable for some applications because it weakens the strength of the pin. Pins 18 and 28 may be coated with a corrosion resistant material, for example zinc oxide.

Figure 4:
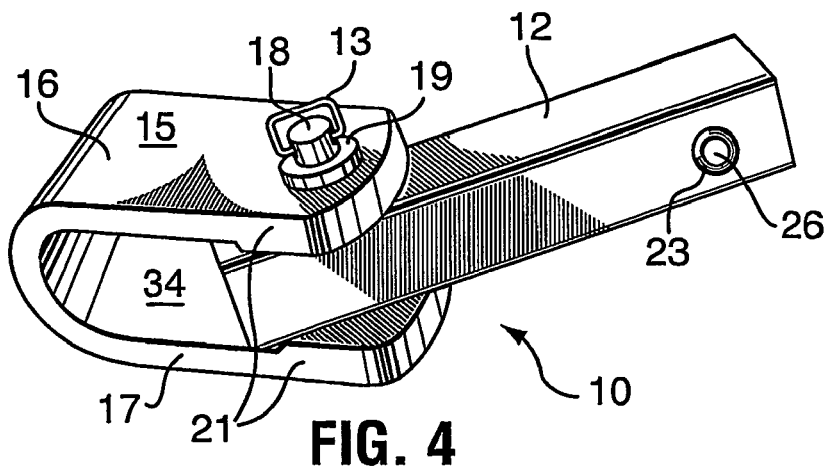
FIG. 4 is side perspective view of an embodiment of the hitch assembly disclosed herein, in a slightly bent position.

In one embodiment, the apertures of hitch assembly 10 are lined with a support material 23 that functions to reinforce these apertures and to decrease wear. FIGS. 4 and 9 show this support material in aperture 26, however it is understood that said support material may likewise line apertures (not shown) formed in legs 15 and 17 or the aperture (not shown) formed in the coupling tongue 12 that corresponds with apertures. Particularly preferred is the use of support material in apertures of clevis 16, to provide added strength to clevis 16 in this region and to decrease wear and/or deformation of the aperture. The support material may be an annular ring inserted into the apertures, for example a steel ring such as a stainless steel ring, or a ring made of a suitably strong polymeric or synthetic material such as nylon. Stainless steel is preferred because it is corrosion resistant.

Hitch assembly 10 may be formed of suitable steel bar stock—for example AISA 1018 steel. But, other metals and materials having sufficient strength and durability may be used. In one embodiment hitch assembly 10 is constructed partially of aluminum alloy. Further, the inventor has surprisingly found that hitch assembly 10 may be made almost entirely out of aluminum alloy. In tests performed, the maximum load carrying capacity of an aluminum alloy hitch assembly in which only hitch pin 18 was comprised of steel, was greater than that of a steel hitch assembly of the same size. Therefore, aluminum alloy provided a hitch assembly that was lighter in weight than a similarly-sized steel assembly, yet was able to carry higher loads than the steel hitch assembly. Accordingly, in a particularly preferred embodiment, hitch assembly 10 is constructed, except for hitch pin 18, entirely out of aluminum alloy. In one embodiment, the aluminum alloy is 6061-T6511 aluminum alloy.

Towing member 20 is a flexible element disposed within opening 34. Opening 34 is an enclosed space that retains towing member 20, so that the towing member cannot slip out of the opening while the hitch assembly 10 is being used. The inside surface 36 of a curved portion forming a closed end 38 of clevis 16 may be ground and rounded to lessen the probability that towing member 20 will be damaged by abrasion from clevis 16. Towing members 20 may be made of any of a number of materials including synthetic and natural polymeric materials and metal. Towing members typically include ropes, chains, cables and towing belts, with towing belts (straps) being preferred. The hitch assembly 10 is particularly suited for use with a towing belt or other broad towing member, especially when an aluminum clevis 16 is being used, as a towing belt distributes the applied force over a larger area than would a cable or chain.

Figure 5:
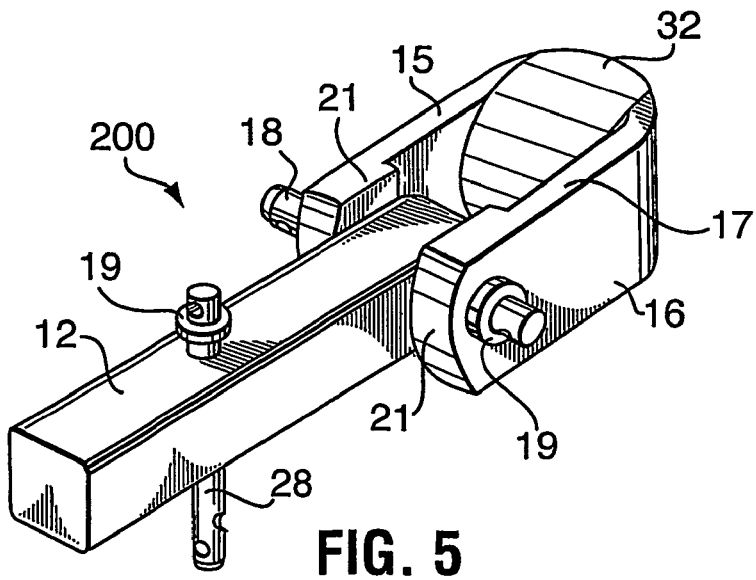
FIG. 5 is a side perspective view of an embodiment of the hitch assembly disclosed herein.
Figure 6:
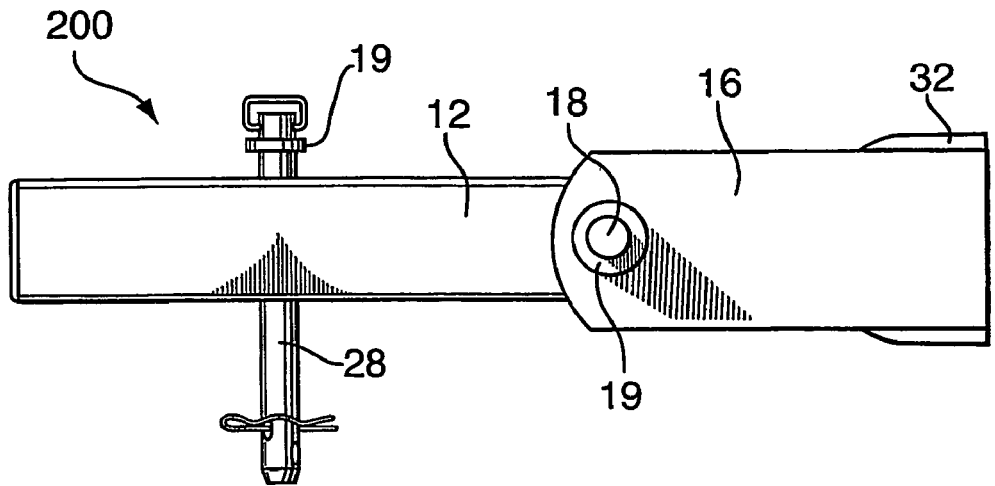
FIG. 6 is a top elevation view of an embodiment of the hitch assembly disclosed herein.
Figure 7:
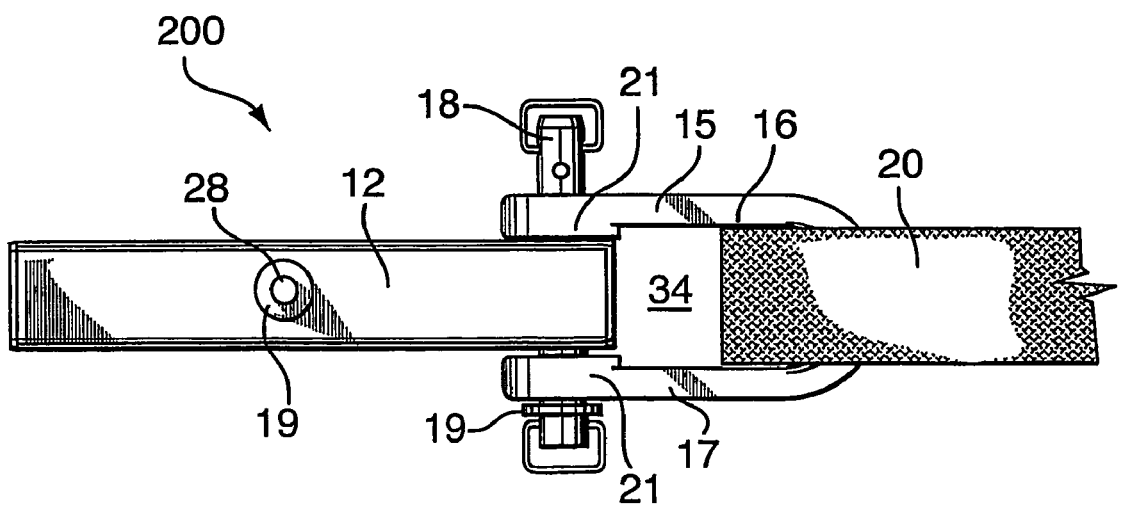
FIG. 7 is a side elevation view of the embodiment of the hitch assembly of FIGS. 5 and 6, with a towing belt mounted thereon.
Figure 8:
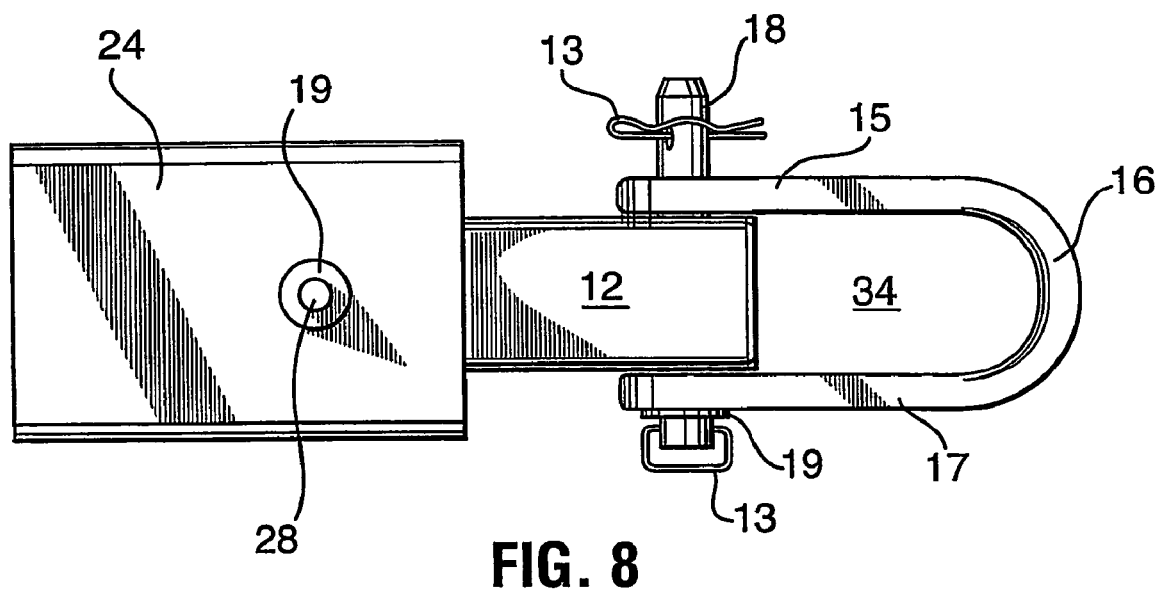
FIG. 8 is a side elevation view of an embodiment of the hitch assembly disclosed herein.

In another embodiment 200, shown in FIGS. 5-7, the hitch assembly additionally comprises a towing member adapter 32 within opening 34. Towing member adapter 32 functions to spread the load experienced by the towing member 20 over a large curved area, rather than merely at the edges 40 where the towing member 20 comes into contact with clevis 16, This embodiment may avoid breakage of the towing member 20 when very heavy loads are being towed. Towing member adapter 32 may be welded to clevis 16, or it may be formed as part of a unitary construct with clevis 16. The heavy U-bend in combination with the U-shaped towing member adapter cooperate to distribute the load to the towing member by providing a more liberal radius at the location of attachment. This feature is particularly useful when the hitch assembly is being used in combination with a towing belt. Towing member adaptor may be comprised of metal, for example steel or aluminum.

Also disclosed herein is a method of towing a vehicle. The method involves the use of a hitch assembly 10 to connect a tow vehicle to a vehicle needing to be towed. According to the method, hitch assembly 10 is coupled to a vehicle 14, by inserting coupling tongue 12 into the coupling socket 22 of receiver 24, followed by insertion of coupling pin 28 through the apertures on receiver 24 and through the corresponding aperture 26 of coupling tongue 12. Retainer 13 is inserted to hold the coupling pin in place. As is apparent, depending upon the particular circumstances, hitch assembly 10 may be attached to the vehicle that is being towed, or to the vehicle that is doing the towing. Towing member 20 may be inserted through opening 34 either before or after the hitch assembly is attached to the vehicle. One way of accomplishing this is to remove clevis 16 from coupling tongue 12 by removing hitch pin 18, inserting the towing member between legs 15 and 17, putting clevis 16 back onto coupling tongue 12 and reinserting hitch pin 18 and retainer 13, to hold the hitch pin in place. The other end of towing member 20 may then be attached to the second vehicle—either the tow vehicle or the vehicle doing the towing (usually the vehicle that is doing the towing). For example, the towing member may comprise a hook for attachment to a bumper or frame. As is apparent, two hitch assemblies' 10 may be used in any particular operation. Tension is then applied to the towing member to move the vehicle that is being towed. The hitch assembly 10 is preferably used with a towing belt, because if too much tension is applied during the towing operation, under most conditions the strap will break before the hitch assembly breaks. As it is the strap that breaks and not the hitch assembly itself, there is little possibility of serious damage to nearby people or property.

EXAMPLE

The performance of maximum load carrying capacity of an aluminum hitch was compared to a steel hitch of the same size.

6061-T6511 aluminum has an ultimate stress level of approximately 46 ksi, a yield stress of 41 ksi according to mill tests. This compares to AISI 1018 steel, which has a value of ultimate stress of 58 ksi, a yield stress of 32 ksi and an elongation of 25%. The yield stress of the aluminum is higher while the ultimate stress is lower as compared to steel.

Testing was conducted on a servo-hydraulic testing machine capable of loading to 130,000 lbs. The aluminum hitch was made from 6061-T6511 aluminum alloy. The clevis and coupling tongue were constructed of solid aluminum alloy. These two parts are pivotally attached by a ¾ inch diameter AISI hot-rolled steel pin. The coupling tongue was attached to the testing machine using a ⅝ inch diameter AISI hot-rolled steel pin.

Failure occurred at the ⅝ inch diameter pin, at a load of 69,430 lbs, which is 15% higher than that obtained for a previous test on the same sized steel hitch (58,900 lbs). The higher load is the result of greater deflections and redistributions of loads transferred to the ⅝ inch diameter pin, allowing it to fail in combined bending and shear. This results in a higher load for failure of the pin, since in the case of the steel hitch assembly, it failed only as a result of shear.

While the invention has been described in conjunction with the disclosed embodiments and example, it will be understood that the invention is not intended to be limited to these embodiments and example. On the contrary, the invention is intended to cover alternatives, modifications and equivalents, which may be included within the spirit and scope of the invention as defined by the appended claims.

We claim:

1. A hitch assembly comprising:
   a) a clevis made of aluminum alloy, the clevis comprising:
      a first clevis end;
      a first clevis aperture at the first clevis end;
      a second clevis end spaced apart from the first clevis end;
      a second clevis aperture at the second clevis end;
      the first clevis aperture at the first clevis end being axially aligned with the second clevis aperture at the second clevis end; and
   b) a hitch pin made of steel that extends through both the first clevis aperture at the first clevis end and the second clevis aperture at the second clevis end;
   wherein a curved portion of the clevis is wider than it is thick, and hence non-circular in cross section;
   wherein the curved portion of the clevis is configured to contact a towing member that attaches the hitch assembly to one of a vehicle to be towed or a tow vehicle, and
   wherein the clevis is configured to receive the towing member therethrough such that the towing member wraps around and contacts the curved portion of the clevis when the hitch assembly endures a load while being used to tow the vehicle to be towed.

2. The hitch assembly of claim 1, further comprising a coupling tongue disposed between the first clevis end and the second clevis end, the coupling tongue comprising a coupling tongue aperture, and the hitch pin extending through the first clevis aperture, the coupling tongue aperture, and the second clevis aperture.

3. The hitch assembly of claim 2, wherein the clevis is U-shaped.

4. The hitch assembly of claim 3, wherein the entire U-shaped clevis is significantly wider than it is thick, and hence substantially flat in cross section.

5. The hitch assembly of claim 1, wherein the clevis is U-shaped.

6. The hitch assembly of claim 5 wherein the entire U-shaped clevis is significantly wider than it is thick, and hence substantially flat in cross section.

7. The hitch assembly of claim 6, wherein the clevis is comprised of a solid, rectangular aluminum alloy bar bent into the U-shape.

8. The hitch assembly of claim 1, wherein the clevis is comprised of a solid, rectangular aluminum alloy bar bent into a U-shape.

9. A method for towing a vehicle to be towed, said method comprising:
   (a) mounting the hitch assembly of claim 1 into a receiver on one of the vehicle to be towed or a tow vehicle, the curved portion of the clevis configured to contact the towing member that attaches the hitch assembly to one of the vehicle to be towed or the tow vehicle;
   (b) inserting the towing member through the clevis of the hitch assembly,
   (c) attaching the towing member to the other of: the vehicle to be towed or the tow vehicle, and
   (d) applying a towing force to the towing member with the tow vehicle to tow the vehicle to be towed.

10. A hitch assembly comprising:
    (a) a clevis made of aluminum alloy, the clevis further comprising:
       a first clevis leg having a first clevis aperture in a first clevis end;
       a second clevis leg having a second clevis aperture in a second clevis end;
       a curved end connecting the first clevis leg and the second clevis leg;
       a space between the first clevis end and the second clevis end;
       wherein the first clevis aperture and the second clevis aperture are axially aligned; and
    (b) a pin made of steel, wherein the pin extends through both the first clevis aperture and second clevis aperture;
    wherein the curved end of the clevis is wider than it is thick, and hence non-circular in cross section;
    wherein the curved end of the clevis is configured to contact a towing member that attaches the hitch assembly to one of a vehicle to be towed or a tow vehicle, and
    wherein the clevis is configured to receive the towing member therethrough such that the towing member wraps around and contacts the curved end of the clevis when the hitch assembly endures a load while being used to tow the vehicle to be towed.

11. The hitch assembly of claim 10, further comprising a coupling tongue disposed in the space between the first clevis end and the second clevis end, the coupling tongue comprising a coupling tongue aperture, and the hitch pin extending through the coupling tongue aperture.

12. The hitch assembly of claim 11, wherein the clevis is U-shaped.

13. The hitch assembly of claim 12, wherein the entire U-shaped clevis is significantly wider than it is thick, and hence substantially flat in cross section.

14. The hitch assembly of claim 10, wherein the clevis is U-shaped.

15. The hitch assembly of claim 14, wherein the entire U-shaped clevis is significantly wider than it is thick, and hence substantially flat in cross section.

16. The hitch assembly of claim 14, wherein the clevis is comprised of a single piece of solid aluminum alloy bar stock bent into the U-shape, forming a weldless and seamless U-shaped clevis.

17. The hitch assembly of claim 10, wherein the clevis is comprised of a single piece of solid aluminum alloy bar stock bent into a U-shape, forming a weldless and seamless U-shaped clevis.

18. A method for towing a vehicle to be towed, said method comprising:
    (a) mounting the hitch assembly of claim 10 into a receiver on one of the vehicle to be towed or a tow vehicle, the curved end of the clevis configured to contact the towing member that attaches the hitch assembly to one of the vehicle to be towed or the tow vehicle;
    (b) inserting the towing member through the clevis of the hitch assembly,
    (c) attaching the towing member to the other of: the vehicle to be towed or the tow vehicle, and
    (d) applying a towing force to the towing member with the tow vehicle to tow the vehicle to be towed.

* * * * *